United States Patent [19]

Brody

[11] 4,059,747

[45] Nov. 22, 1977

[54] DEMAND CONTROLLER

[76] Inventor: Mitchell D. Brody, 77 Gibbs St., Brookline, Mass. 02146

[21] Appl. No.: 693,865

[22] Filed: June 8, 1976

[51] Int. Cl.² .......................................... G06F 15/56
[52] U.S. Cl. .............................. 364/493; 324/103 R; 364/483
[58] Field of Search ...................... 235/151.21, 151.31, 235/151.3, 151, 151.1, 92 CP, 92 MT, 92 T, 92 TF, 92 FQ, 92 EL, 92 CT; 324/103 R, 116; 340/151, 178, 179, 310 A; 307/31-35

[56] References Cited

U.S. PATENT DOCUMENTS

| | | | |
|---|---|---|---|
| 2,998,917 | 9/1961 | Werme | 235/151.21 |
| 3,424,980 | 1/1969 | Anderson | 235/151.21 X |
| 3,502,980 | 3/1970 | Baggott | 235/92 EL |
| 3,652,838 | 3/1972 | Dillon et al. | 235/151.21 X |
| 3,789,201 | 1/1974 | Carpenter et al. | 324/103 R X |

Primary Examiner—Joseph F. Ruggiero

Attorney, Agent, or Firm—Wolf, Greenfield & Sacks

[57] ABSTRACT

The system controls the operation of one or more interruptable electrical loads to maintain the total electrical power demand during a demand interval within certain predetermined limits. The demand forecaster makes periodic projections of the metered demand to the end of the demand interval based upon the current rate of energy consumption (instantaneous demand) and the accumulated energy consumption during the demand interval. If the projected value indicates that a demand peak will occur, the system signals a "shed" condition for the load thereby interrupting the load to prevent the occurrence of the peak. Conversely, if the system detects a projected low value of the demand, a "restore" condition exists whereby the load is turned on to take advantage of the available electrical capacity. The system comprises a pair of loadable up/down counters, and an accumulator, which may consist of a two-port multiplexer, a full adder and associated data latch.

12 Claims, 1 Drawing Figure

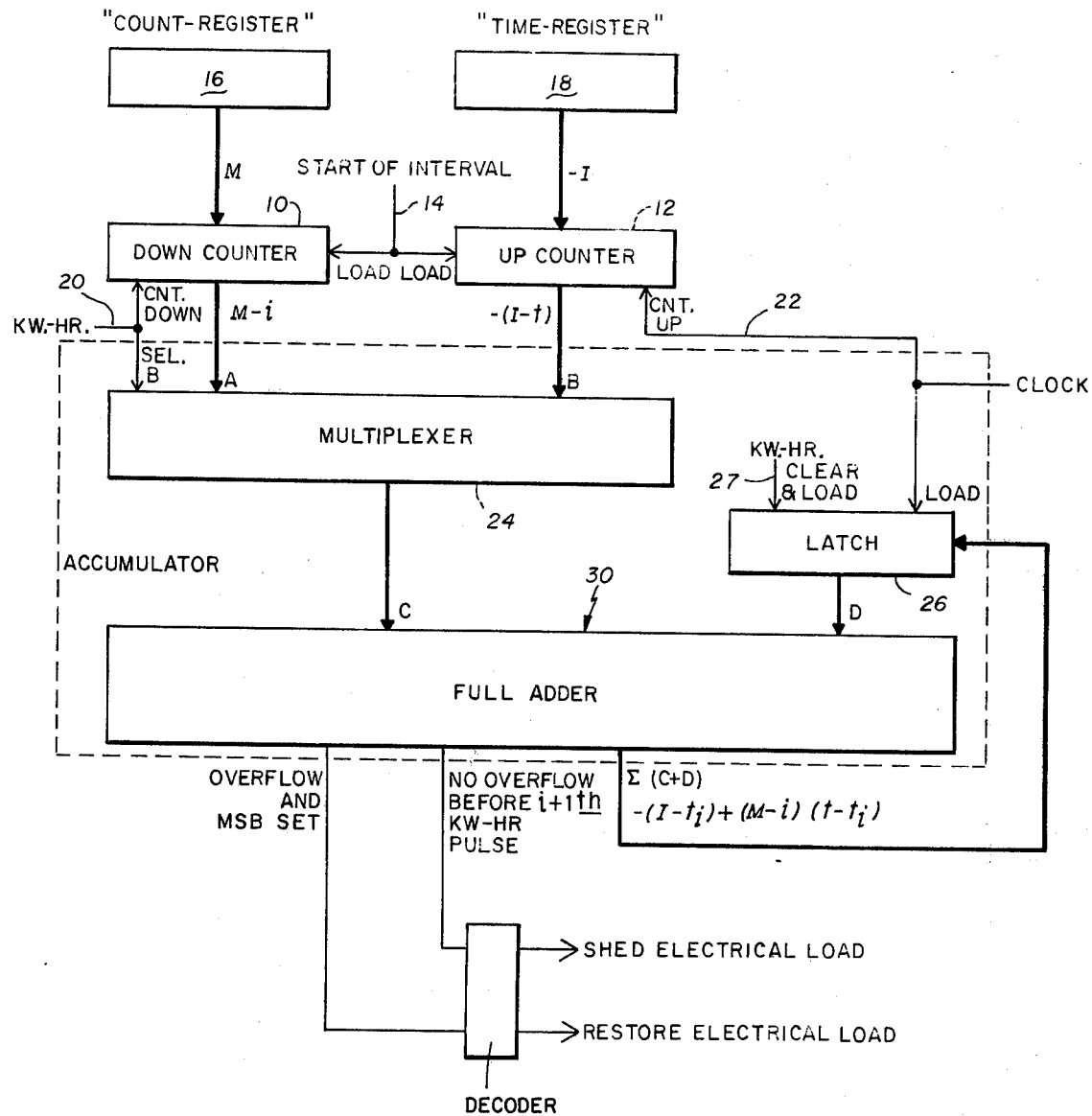

DEMAND CONTROLLER

BACKGROUND OF THE INVENTION

The present invention relates to a system for controlling the operation of one or more interruptable electrical loads. The purpose of the demand controller of this invention is to maintain the total electrical power demand of the load at or below a predetermined peak demand. The concepts of this invention may be used for controlling a single interruptable electrical load but are preferably employed in controlling a plurality of interruptable electrical loads on a priority basis.

An electrical power demand is metered usually on the basis of a predetermined demand interval which may be, for example, a 15 minute, 30 minute or 60 minute demand interval. During this demand interval the consumption of electrical energy is accumulated and averaged. In addition to kilowatt-hour usage the customer is assessed a substantial additional charge based on the maximum value of this average during one or more billing periods. Thus, in the past systems have been devised for maintaining the demand below a predetermined peak value during the demand interval thereby limiting this peak demand charge. Some of these techniques, however, such as a zero-order constant rate comparison technique had not been totally satisfactory.

Accordingly, one object of the present invention is to provide a demand controller having an improved forecasting technique.

Another object of the present invention is to provide a demand control technique that can be implemented relatively simply without the need for excessive complex data processing and logic circuitry.

SUMMARY OF THE INVENTION

To accomplish the foregoing and other objects of this invention there is provided a demand controller or demand forecaster which makes periodic projections of the metered demand to the end of the demand interval based upon the current rate of energy consumption (instantaneous demand) and the accumulated energy consumption during the demand interval. If the projected value indicates that a demand peak will occur, the system signals a "shed" condition for the interruptable load. The load may then be turned off to prevent the occurrence of the peak. Conversely, if the system detects a projected low value of the demand, it signals a "restore" condition for the interruptable load. The load may then be turned on to take advantage of the available electrical capacity. A preset target value in the demand controller determines the value of the threshold for "restore" and "shed" conditions. The "shed" condition occurs when the projection exceeds the target value, while the "restore" condition occurs when the projection is below the target value by a certain percentage such as 75% below the target value. Thus, there is a dead band of 25% in which no action is taken one way or the other. The target, of course, is an adjustable parameter of the system.

The demand forecaster of this invention utilizes a true linear first-order demand forecast technique in which current consumption and rate are both extrapolated to the end of the demand interval. In order to implement the technique of this invention there is provided a first counting means operated by kilowatt-hour pulses from the electrical meter. This first counting means continuously registers a count corresponding to the number of kilowatt hour pulses needed to reach a target count which is indicative of a peak demand count. The system also comprises means for generating clock pulses, and second counting means operated by the clock pulses for continuously registering a negative count corresponding to the time remaining in the demand interval. A selector gate means or two-port multiplexer couples from the output of both counting means to an accumulator. The selector means is responsive to the kilowatt-hour pulses for loading the contents of the second counting means into the accumulator means and for thereafter successively adding the contents of the first counting means upon the occurrence of each clock pulse. The adding in the accumulator is continued until the next kilowatt hour pulse occurs whereupon the contents of the accumulator are then examined to determine whether an overflow or a non-overflow condition exists. An overflow condition followed by a setting of the most significant bit signals a "restore" condition for the system while a non-overflow signal indicates a "shed" condition.

BRIEF DESCRIPTION OF THE DRAWINGS

Numerous other objects, features and advantages of the invention should now become apparent upon a reading of the following detailed description taken in conjunction with the sole drawing which is a block diagram showing a preferred arrangement for the demand controller of this invention.

DETAILED DESCRIPTION

The demand controller or demand forecaster receives input pulses from a kilowatt-hour electric meter. The accumulated number of such pulses is proportional to the energy consumed and the rate of the pulses is proportional to the instantaneous power demand. The forecaster also receives pulses that demarcate the demand interval. These demand interval defining pulses may be internally generated by the forecaster itself but usually are taken from an external electromechanical source such as a synchronous electric clock for the purpose of synchronizing with the demand metering equipment in the event of a power failure. In accordance with the concept of this invention the forecast is made between the occurrence of kilowatt-hour pulses. Typically, these kilowatt-hour pulses occur every few seconds such as every 2 to 4 seconds.

The periodic clock pulses establish a time-base and the following parameters can be defined:

$I$ = number of clock pulses in the demand interval or which relates or can be expressed as the time duration of the demand interval which is a fixed number. For example, this parameter may be expressed as 30 minutes or 3000 pulses which of course corresponds to a frequency of 100 pulses per minute.

$t_i$ = number of clock pulses or time into the demand interval when the $i$th kilowatt-hour pulse occurs.

$M$ = maximum desired number of kilowatt-hour pulses for the demand interval, also referred to as the target.

Then the rate of energy consumption (the instantaneous power demand) is proportional to $$\frac{1}{t_i - t_{i-1}} \qquad (1)$$

That is, the demand is inversely proportional to the time interval between pulses. Also, the time remaining in the demand interval is given by:

$$I - t_i \quad (2)$$

Consequently, the number of additional kilowatt-hour pulses which can be expected during the remainder of the demand interval (by linear extrapolation) is given by:

$$\frac{I - t_i}{t_i - t_{i-1}} \quad (3)$$

Therefore, the total number of kilowatt-hour pulses expected at the demand interval is given by:

$$i + \frac{I - t_i}{t_i - t_{i-1}} \quad (4)$$

where $i$ is the number of kilowatt-hour pulses accumulated at the time of the forecast (time $t_i$).

Normally, to calculate this value of the total number of kilowatt-hour pulses requires a division operation as shown in equation (4) necessitating significant circuit complexity. However, the actual forecast value is not needed. Only a comparison with the target M is important, for this determines the action that will be taken with the load. Thus, the following equality/inequality may be considered:

$$i + \frac{I - t_i}{t_i - t_{i-1}} \lesseqgtr M \quad (5)$$

Equation (5) may be rewritten as follows:

$$I - t_i \lesseqgtr (M - i)(t_i - t_{i-1}) \quad (6)$$

Thereby removing the division operation and substituting instead a multiplication operation which is implemented as follows:

$$(M - i)(t_i - t_{i-1}) = \sum_{t_{i-1}}^{t_i} (M - i) \quad (7)$$

That is, the product on the left side of equation (7) equals a repeated summation every clock pulse of the quantity $M - i$, which is essentially performed using low cost circuitry. Consequently, equation (6) may be rewritten as follows:

$$0 \lesseqgtr -(I - t_i) + \sum_{t_{i-1}}^{t_i} (M - i) \quad (8)$$

The equation (8) represents an equality/inequality which is tested simply by overflow/non-overflow/zero conditions. The quantity appearing in the right hand side of equation (8) will appear in an accumulator which is loaded at time $t_{i-1}$ (when the $i-1$ th kilowatt hour pulse is detected) with the quantity $-(I-t_{i-1})$. After this initial quantity is loaded into the accumulator the quantity $(M-i+1)$ is added every clock pulse until the time $t_i$ (when the $i$th kilowatt-hour pulse is detected). This relationship may be expressed as follows:

$$-(I - t_{i-1}) + \sum_{t_{i-1}}^{t_i} (M - i + 1) = -(I - t_{i-1}) +$$

$$(t_1 - t_{i-1}) + \sum_{t_{i-1}}^{t_i} (M - i)$$

= right-hand side of (8).

Inputs to the accumulator are coupled from a time register which is loaded with the quantity $-I$ at the start of the demand interval. This time register is incremented at each clock pulse. Another input to the accumulator is from a count register which is loaded with the quantity M at the start of the demand interval. The count register is decremented at each kilowatt-hour pulse. If the accumulator does not overflow by the time the next kilowatt-hour pulse arrives then a linear extrapolation of the present rate of power consumption to the end of the demand interval indicates that the target M will be exceeded, and that in turn indicates a "shed" condition for the load. On the other hand an overflow condition indicates that the target will not be exceeded.

A non-overflow condition may be due to a combination of the following factors: (a) the target is almost met at the present time usually with sufficient time remaining in the demand interval ($M-i+1$ is very small); (b) the power consumption is very high and the kilowatt-hour pulses are occurring quite rapidly ($t_i-t_{i-1}$ is very small); and (c) there remains a large amount of time in the demand interval over which the pulses can accumulate (the quantity $-(I-t_{i-1})$ is highly negative).

As previously mentioned an overflow condition indicates that the target will not be exceeded which in turn indicates a "restore" or "maintain" condition. A double overflow (2 bits' of overflow) indicates that half the target will not be exceeded and a single overflow with the most significant bit of the accumulator "set" indicates that three-quarters of the target will not be exceeded. This is a previously stated "restore" condition for the load (less than 75% of the target).

Referring now to the drawing there is shown a block diagram of a preferred implementation of the concept of this invention. The drawing shows the count register 10 and the time register 12 both of which may be conventional up/down counters of the circuit type 74193. Both of these counters are loaded at the same time by a load signal on line 14 which is a periodic signal indicating the commencement of the demand interval. The signal on line 14, as previously mentioned may be coupled from a synchronous clock associated with the demand meter.

The count register, in addition to comprising counter 10 also comprises box 16 which may be a switch array for wiring the quantity M to the counter 10. Similarly, the time register, in addition to comprising the counter 12 may comprise box 18 which may be a switch array or a set of jumpers for wiring the quantity $-I$ to the counter 12. At the time of occurrence of the load pulse on line 14 the quantities M and $-I$ are loaded respectively into the counters 10 and 12. The counter 10 is operated to decrement while the counter 12 is operated to increment.

The counter 10 receives input pulses for counting down which are kilowatt-hour pulses coupled on line 20. The counter 12 is conditioned to count up by clock pulses on line 22. The kilowatt-hour puses on line 20 also couple to the multiplexer 24 while the clock pulses also couple to the flip-flop latch 26.

The multiplexer 24 may be a conventional circuit type 74157 sometimes referred to as a data selector. Multiplexer 24 selects the data from either the counter 10 or the counter 12 depending upon the state of signal on line 20. The multiplexer selects which of the two data sources is to be added or loaded into the accumulator. The accumulator itself basically comprises the binary full adder 30 and the data latch 26. On a kilowatt-hour pulse the contents of counter 10 are loaded by way of the multiplexer 24 to the adder 30. Thereafter, on each successive clock pulse the contents of the counter 10 is added to the contents of the adder passing by way of the multiplexer 24. When the next kilowatt-hour pulse arrives, overflow or non-overflow conditions are sensed as is the most significant bit in the accumulator (adder 30).

The forecasting in accordance with the invention is performed between the occurrence of kilowatt-hour pulses. It is noted that the kilowatt-hour pulse couples to line 27 which is a clear and load signal for the data latch 26. Thus, at the occurrence of a kilowatt-hour pulse the latch 26 is cleared as is the adder 30. Upon the occurrence of this kilowatt-hour pulse the contents of the counter 12 are transferred to the adder 30. Thus, there is an initial negative count in the adder 30 which count is dependent upon the present temporal position in the demand interval. After the lapse of this kilowatt-hour pulse the multiplexer now controls to receive data from the counter 10. Upon the occurrence of each subsequent clock pulse there is a load signal to the latch 26 which adds the positive contents of the counter 10 via the multiplexer 24 to the contents in the adder 30. This addition continues upon the occurrence of each clock pulse. If upon the occurrence of the next kilowatt-hour pulse the adder still is at a negative number then this indicates no overflow or a "shed" condition. This "shed" signal may be coupled to an electrical load for interrupting operation of the load. Alternatively, upon the occurrence of the next kilowatt-hour pulse if the adder has a sufficient positive count there is an output "restore" signal which may couple to an electrical load for maintaining or commencing operation of the load. Actually, the "shed" and "restore" signals may both couple to the same load for controlling operation thereof. By sensing a particular predetermined binary digit in the adder 30 the degree of overflow can be easily detected and can be set at any different value to provide a variable dead band. The number of bits required depends in part on the clock frequency, length of the demand interval, target size, etc.

It is understood that other implementations may be used other than the one shown in the sole block diagram. For example, decade (BCD) switches may be used in which case BCD circuit types are substituted. For example, the time register and count register instead of being a circuit type 74193 may be a circuit type 74192. Alternatively, a BCD 2 binary converter such as a circuit type 74184 may be employed to convert switch settings to binary.

At the beginning of the demand interval the contents of counter 12 is very negative but if the kilowatt-hour pulses are occurring rather rapidly very few positive counts will be added and thus no overflow condition will exist. This indicates that the load should be "shed" because of the high demand (rapid kilowatt-hour pulses). On the other hand if the demand is low then the positive additions from counter 10 are relatively large and an overflow is more apt to occur. In other words the target is still a long way off and the demand is not sufficiently high to shed the load thus indicating a "restore" condition. This condition is especially so when the target is still a long distance off and yet the counter 12 has relatively small negative count therein, meaning that the end of the demand interval is being approached. Under those conditions there is easily an overflow.

In the drawing the output from the adder 30 is shown as two lines that generate either an "overflow" condition or a "no overflow" condition. The adder output may couple to a binary decoder conditioned to decode certain counts or groups of counts from the adder. A count over a certain predetermined count may indicate an overflow while the predetermined count and lesser counts could indicate no overflow. Certain positions of the decoder can be sensed, such as the most significant bit to determine the degree of overflow.

What is claimed is:

1. A system for controlling a load means to forecast power consumption and maintain the total electrical power demand below a predetermined peak value, said system comprising;
   first counting means operated by kilowatt-hour pulses for continuously registering a count corresponding to the number of kilowatt-hour pulses needed to reach a target count indicative of a peak demand count,
   means for generating clock pulses,
   second counting means operated by said clock pulses for continuously registering a count corresponding to the time remaining in the demand interval,
   accumulator means,
   and selector means responsive to said kilowatt-hour pulses and said clock pulses and including means for loading the contents of the second counting means into the accumulator means and means for thereafter combining the contents of the first counting means with the contents of the second counting means upon the occurrence of each clock pulse.

2. A system as set forth in claim 1 wherein said accumulator means comprises a bipolar adder and associated latch.

3. A system as set forth in claim 2 wherein said adder is a binary adder having one input coupled from the selector means and another input coupled from the latch, said latch comprising a plurality of flip-flops corresponding in number to the number of bits of the adder.

4. A system as set forth in claim 1 wherein said first counting means comprises a down counter and means for initially loading a fixed target count into the down counter at the commencement of the demand interval.

5. A system as set forth in claim 4 wherein said second counting means comprises an up counter and means for initially loading a fixed negative count corresponding to the length of the demand interval into the up counter at the commencement of the demand interval.

6. A system as set forth in claim 5 wherein said selector means comprises a multiplexer having an input for receiving the kilowatt-hour pulses, a multi-bit binary input coupled from the down counter and a multi-bit binary input coupled from the up counter.

7. A system as set forth in claim 6 wherein said latch receives a kilowatt-hour input pulse for periodically clearing the latch and loading the adder.

8. A system as set forth in claim 1 including means responsive to the contents of the accumulator means for controlling the operation of the load means.

9. A system as set forth in claim 1 wherein said first and second counting means are adapted to count each in an opposite polarity to the other.

10. A system as set forth in claim 1 wherein said first and second counting means are adapted to count each in an opposite sense to the other.

11. A system as set forth in claim 1 wherein one of said counting means is adapted to count up while the other counting means counts down.

12. A system as set forth in claim 1 including means responsive to initiation of a demand interval for loading one of the counting means with a positive count and the other counting means with a negative count.

* * * * *